US011692105B2

(12) United States Patent
Wegner et al.

(10) Patent No.: US 11,692,105 B2
(45) Date of Patent: Jul. 4, 2023

(54) ELECTROCOATS CONTAINING AT LEAST ONE TRIAZINE COMPOUND

(71) Applicant: BASF Coatings GmbH, Münster (DE)

(72) Inventors: Egon Wegner, Muenster (DE); Oliver Johannpoetter, Muenster (DE); Tobias Blang, Muenster (DE)

(73) Assignee: BASF COATINGS GMBH, Münster (DE)

(*) Notice: Subject to any disclaimer, the term of this patent is extended or adjusted under 35 U.S.C. 154(b) by 483 days.

(21) Appl. No.: 16/648,013

(22) PCT Filed: Oct. 8, 2018

(86) PCT No.: PCT/EP2018/077347
§ 371 (c)(1),
(2) Date: Mar. 17, 2020

(87) PCT Pub. No.: WO2019/072774
PCT Pub. Date: Apr. 18, 2019

(65) Prior Publication Data
US 2020/0270468 A1 Aug. 27, 2020

(30) Foreign Application Priority Data

Oct. 9, 2017 (EP) .................................... 17195433

(51) Int. Cl.
B32B 15/092 (2006.01)
B32B 27/38 (2006.01)
C09D 5/44 (2006.01)
C09D 163/00 (2006.01)
C25D 13/08 (2006.01)
C25D 13/20 (2006.01)
C09D 17/00 (2006.01)
C25D 13/04 (2006.01)
C08K 3/04 (2006.01)
C08K 3/28 (2006.01)
C08K 3/22 (2006.01)

(52) U.S. Cl.
CPC ......... *C09D 5/4438* (2013.01); *C09D 17/001* (2013.01); *C09D 17/005* (2013.01); *C09D 17/008* (2013.01); *C09D 163/00* (2013.01); *C25D 13/04* (2013.01); *C08K 3/04* (2013.01); *C08K 3/28* (2013.01); *C08K 2003/2241* (2013.01)

(58) Field of Classification Search
None
See application file for complete search history.

(56) References Cited

U.S. PATENT DOCUMENTS

| 5,084,541 | A | 1/1992 | Jacobs, III |
| 5,324,404 | A | 6/1994 | Ott et al. |
| 6,146,707 | A | 11/2000 | Sapper et al. |
| 6,274,649 | B1 | 8/2001 | Ott et al. |
| 6,624,215 | B1 | 9/2003 | Hiraki et al. |
| 6,736,950 | B1 | 5/2004 | Klein et al. |
| 6,951,602 | B1 | 10/2005 | Reuter et al. |
| 9,493,660 | B2 | 11/2016 | Brinkhaus et al. |
| 2003/0150730 | A1 | 8/2003 | Hartung et al. |

FOREIGN PATENT DOCUMENTS

| DE | 19703869 A1 | 8/1998 | |
| DE | 19712940 A1 | 10/1998 | |
| DE | 19921223 A1 | 11/2000 | |
| DE | 10036560 A1 | 2/2002 | |
| EP | 0505445 B1 | 11/1994 | |
| EP | 1041125 A1 * | 10/2000 | ............. C09D 5/086 |
| EP | 1192226 B1 | 6/2005 | |
| EP | 1743925 A1 | 1/2007 | |
| EP | 2147955 A1 * | 1/2010 | ........... C08G 59/184 |
| JP | H09194769 A | 7/1997 | |
| WO | 9931187 A1 | 6/1999 | |
| WO | 2009021719 A2 | 2/2009 | |

OTHER PUBLICATIONS

English translation of International Search Report for International Application No. PCT/EP2018/077347, dated Nov. 9, 2018, 2 pages.

* cited by examiner

*Primary Examiner* — Michael J Feely
(74) *Attorney, Agent, or Firm* — Armstrong Teasdale LLP

(57) ABSTRACT

The present disclosure relates to a cathodically depositable aqueous electrodeposition coating material including at least one epoxide-amine adduct (a), at least one pigment and/or at least one filler (b), and at least one crosslinking agent (c), a fraction of at least 25 wt % of the crosslinking agent (c), based on the total weight of the crosslinking agent (c), being formed by at least one tris(alkoxycarbonylamino)-1,3,5-triazine; to a method for coating an electrically conductive substrate by cathodic electrodeposition coating using said electrodeposition coating material; to a substrate coated accordingly; and also to a use of a tris(alkoxycarbonylamino)-1,3,5-triazine in a cathodically depositable electrodeposition coating material for reducing or eliminating the sensitivity to disruption of the electrodeposition coating bath toward impurities present therein through phosphates and/or through other metal salts which have been carried into the electrodeposition coating bath as a result of pretreatment steps ahead of the electrodeposition coating.

24 Claims, No Drawings

ELECTROCOATS CONTAINING AT LEAST ONE TRIAZINE COMPOUND

CROSS-REFERENCE TO RELATED APPLICATIONS

This application is a U.S. National Phase Application of PCT/EP2018/077347, filed Oct. 8, 2018, which claims the benefit of priority to EP Application No. 17195433.2, filed Oct. 9, 2017, the contents of which are hereby expressly incorporated by reference in their entirety.

The present invention relates to a cathodically depositable aqueous electrodeposition coating material comprising at least one epoxide-amine adduct (a), at least one pigment and/or at least one filler (b), and at least one crosslinking agent (c), a fraction of at least 25 wt % of the crosslinking agent (c), based on the total weight of the crosslinking agent (c), being formed by at least one tris(alkoxycarbonylamino)-1,3,5-triazine; to a method for coating an electrically conductive substrate by cathodic electrodeposition coating using said electrodeposition coating material; to a substrate coated accordingly; and also to a use of a tris(alkoxycarbonylamino)-1,3,5-triazine in a cathodically depositable electrodeposition coating material for reducing or eliminating the sensitivity to disruption of the electrodeposition coating bath toward impurities present therein through phosphates and/or through other metal salts which have been carried into the electrodeposition coating bath as a result of pretreatment steps ahead of the electrodeposition coating.

PRIOR ART

In the automobile sector, the metallic components used for manufacture must customarily be protected against corrosion. The requirements in terms of the corrosion control to be achieved are very exacting, not least because the manufacturers often offer a guarantee against rust perforation over many years. Such corrosion control is customarily achieved through the coating of the components, or of the substrates used to manufacture them, with at least one coating suitable for that purpose.

In order to be able to ensure the necessary corrosion control, it is common practice to apply an electrodeposition coating film to the metallic substrate, this substrate having possibly been pretreated by phosphating. Electrodeposition coating (electrocoat) materials are coating materials which comprise film formers, pigments and/or fillers, and, frequently, additives. There are anodically and cathodically depositable electrocoat materials, with the cathodically depositable materials having the greatest importance in industrial coating and particularly in automotive finishing. In cathodic electrodeposition coating, the substrates to be coated are immersed into an electrocoating bath and connected as the cathode. The bath has an anode as the counterelectrode. The particles of the electrocoating dispersion are stabilized with positive charge and deposit on the cathode to form a coating film. Following deposition, the coated substrate is removed from the electrocoating bath and the coating film is baked, i.e., thermally cured.

Electrocoat materials are known in the prior art. DE 199 21 223 A1 discloses a method for electrodeposition coating that envisages the use of a binder system which is curable not only thermally but also by means of UV radiation and for that purpose has olefinically unsaturated double bonds. This makes it possible in particular to carry out electrodeposition coating of substrates having edges that are not directly accessible. Known from DE 100 36 560 A1 are electrocoat materials which can be produced by melt emulsification. European patent EP 1 192 226 B1 describes electrocoat materials which comprise water-soluble polyvinyl alcohol (co)polymers as additives for improving not only edge protection but also the stability toward oil contamination. Lastly, WO 99/31187 A1 discloses cationically depositable electrocoat materials comprising lactic-acid-modified bismuth compounds which allows the use of lead compounds to be avoided but nevertheless achieves sufficient corrosion control. Furthermore, EP 1 743 925 A1 describes electrocoat materials which comprise a combination of a triazine compound and of an OH-functional and amino-group-containing copolymer.

Electrocoat materials are also described in patent application DE 197 03 869 A1 and in patent EP 0 505 445 B1. The binder in the coating materials described therein comprises a mixture of modified epoxy resins and other components capable of crosslinking, especially blocked polyisocyanates. Such blocked polyisocyanates are widespread crosslinkers in cathodic electrocoating. Employed predominantly are aromatic polyisocyanates, since they are the most reactive isocyanates. Examples of suitable polyisocyanates are tolylene diisocyanate (TDI) and 4,4-diisocyanato-diphenylmethane (MDI).

The electrocoat materials described in DE 197 03 869 A1, while they do afford outstanding corrosion control, have the drawback of their sensitivity toward impurities caused by metal phosphates and other metal salts. These impurities are unavoidable in practice because the substrates to be coated, prior to the electrodeposition coating, are generally phosphated in an upstream pretreatment step for further improving the corrosion control, using, for example, zinc phosphating. Given the virtual impossibility of using a cleaning step to free the substrates, automobile bodies for example, entirely from adhering phosphates and any other metal salts, said impurities are carried again and again into the electrodeposition coating bath (phosphate entrainment). Results of this include film defects in the electrocoat finish—which may impair the corrosion control since they disrupt crosslinking; unwanted disadvantages such as inadequate solvent resistance; and, oftentimes, a visual deterioration from the appearance of the ultimate multicoat automotive finish. Moreover, such phosphate entrainment may lead in particular to inadequately cured electrocoat films, particularly on the mass parts of the substrates used such as the door entry region, for example. This poses a major problem, since the phosphate content of a phosphate-contaminated electrocoating bath can in principle only be reduced or eliminated by means of complete or partial replacement of the bath. Such replacement, however, is not economically rational, since it would equate to throwing away a volume of up to 300 000 liters of electrocoat material.

Furthermore, the electrocoat materials known in the prior art such as DE 197 03 869 A1 require comparatively high baking temperatures of 160 to 180° C., for example. A consequence of these high baking temperatures is a high energy consumption, which is undesirable economically. For this purpose, i.e., for reducing the baking temperature, WO 2009/021719 A2 teaches the use in cathodically depositable electrocoat materials of water-insoluble bismuth subnitrate. The presence of the bismuth subnitrate allows the baking temperature to be lowered in comparison to electrocoat materials which comprise water-soluble bismuth salts such as bismuth nitrate.

There is therefore a need for electrocoat materials which do not have at least one of the drawbacks identified above.

Problem

A problem to be addressed for the present invention is therefore in particular that of providing a cathodically depositable electrodeposition coating material wherein the sensitivity to disruption toward impurities through phosphates and/or other metal salts can be greatly reduced or, preferably, eliminated entirely. In addition, the baking temperature needed for the curing of the coating films is to be lowered, and the resulting coating film is not to have any deleterious optical and/or mechanical properties.

Solution

This problem is solved by the subject matter claimed in the claims and also the preferred embodiments of that subject matter that are described in the description hereinbelow.

A first subject of the present invention, therefore, is a cathodically depositable aqueous electrodeposition coating material comprising
  (a) at least one epoxide-amine adduct,
  (b) at least one pigment and/or at least one filler, and
  (c) at least one crosslinking agent,
  wherein a fraction of at least 25 wt % of the crosslinking agent (c), based on the total weight of the crosslinking agent (c), is formed by at least one tris(alkoxycarbonylamino)-1,3,5-triazine and any remaining fraction is formed by at least one crosslinking agent which is different from the at least one tris(alkoxycarbonylamino)-1,3,5-triazine and is selected from the group consisting of blocked polyisocyanates, amino resins, and mixtures thereof.

A further subject of the present invention is a method for at least partially coating an electrically conductive substrate by cathodic electrodeposition coating, in which
  (1) the electrically conductive substrate is immersed at least partially into an electrodeposition coating bath which comprises the electrodeposition coating material of the invention,
  (2) the substrate is connected as cathode,
  (3) a coating film is deposited on the substrate using direct current,
  (4) the coated substrate is removed from the electrodeposition coating bath, and
  (5) the coating film deposited on the substrate is baked.

A further subject of the present invention is an electrically conductive substrate which is coated at least partially with a baked electrodeposition coating material of the invention.

A further subject of the present invention is a use of at least one tris(alkoxycarbonylamino)-1,3,5-triazine in a cathodically depositable electrodeposition coating material in a fraction of at least 25 wt %, based on the total weight of crosslinking agents in the electrodeposition coating material, for reducing or eliminating the sensitivity to disruption of the electrodeposition coating bath toward impurities present therein through phosphates, particularly metal phosphates, and/or through other metal salts which have been carried into the electrodeposition coating bath as a result of pretreatment steps ahead of the electrodeposition coating, and/or for lowering the baking temperature of the electrodeposition coating material in the case of at least partial coating of an electrically conductive substrate to a temperature in a range from 125° C. to 165° C.

It has surprisingly been found that the electrodeposition coating material of the invention, particularly owing to the presence of component (c) and/or of the triazine fraction included therein, has a significantly reduced or entirely eliminated sensitivity to disruption toward contamination through phosphates and/or through other metal salts which have been carried into the electrodeposition coating bath as a result of pretreatment steps ahead of the electrodeposition coating. In particular here it has surprisingly emerged that the electrodeposition coating materials of the invention, even in the (unwanted) presence of phosphates and/or other metal salts, lead to sufficiently cured films after baking, and do so even on mass parts such as the door entry region. It has in particular surprisingly been found that the electrodeposition coating material of the invention—on account in particular of the minimum fraction of 25 wt % of triazine it contains, based on the total weight of the crosslinking agent (c)—is highly insensitive to phosphate, whereas comparative coating materials with a smaller triazine fraction are substantially more sensitive toward phosphate (cf. section 5.6 and table 10 of the experimental data).

Moreover, it has surprisingly been found that the coatings obtained from the electrodeposition coating materials of the invention, particularly by virtue of the presence of component (c) and/or of the triazine fraction included therein, do not have any deleterious optical and/or mechanical properties, and especially no film defects. In particular, the coatings thus obtained are notable for good solvent resistance. Also achieved are good corrosion control of corresponding coated metallic substrates, and good weather resistance on the part of the coatings obtained.

It has surprisingly been found, furthermore, that in particular by virtue of the presence of component (c) and/or of the triazine fraction included therein, the electrodeposition coating material of the invention allows a reduction in the baking temperature in the case of at least partial coating of a suitable substrate.

DETAILED DESCRIPTION

The term "comprising" in the sense of the present invention, in connection for example with the electrodeposition coating material of the invention, preferably has the meaning of "consisting of". With regard to the electrodeposition coating material of the invention it is possible—in addition to components (a), (b), (c) and water—for one or more of the further components identified below and included optionally in the electrodeposition coating material of the invention to be included therein. All components may in each case be present in their preferred embodiments as identified below.

Inventive Electrodeposition Coating Material

The cathodically depositable aqueous electrodeposition coating material of the invention comprises at least the components (a), (b), (c), and also water.

The cathodically depositable aqueous electrodeposition coating material of the invention is suitable for at least partially coating an electrically conductive substrate with an electrodeposition coating material, meaning that it is suitable for application at least partially in the form of an electrodeposition coating film to the substrate surface of an electrically conductive substrate.

The cathodically depositable electrodeposition coating material of the invention is aqueous. The term "aqueous" in connection with the electrodeposition coating material of the invention is understood preferably for the purposes of the present invention to mean that water, as solvent or as diluent, is present as the main constituent, preferably in an amount of at least 35 wt %, based on the total weight of the electrodeposition coating material of the invention. Organic solvents may be present additionally in smaller proportions, preferably in an amount of <20 wt %.

The electrodeposition coating material of the invention preferably includes a water fraction of at least 40 wt %, more preferably of at least 45 wt %, very preferably of at least 50 wt %, more particularly of at least 55 wt %, based in each case on the total weight of the electrodeposition coating material.

The electrodeposition coating material of the invention preferably includes a fraction of organic solvents that is in a range of <20 wt %, more preferably in a range from 0 to <20 wt %, very preferably in a range from 0.5 to 20 wt % or to 17.5 wt % or to 15 wt % or to 10 wt %, based in each case on the total weight of the electrodeposition coating material. Examples of such organic solvents would include heterocyclic, aliphatic, or aromatic hydrocarbons, mono- or polyhydric alcohols, especially methanol and/or ethanol, ethers, esters, ketones, and amides, such as, for example, N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone, methyl isobutyl ketone, acetone, isophorone, or mixtures thereof.

The solids content of the electrodeposition coating material of the invention is preferably in a range from 5 to 45 wt %, more preferably of 5 to 40 wt %, very preferably of 7.5 to 40 wt %, more particularly of 7.5 to 35 wt %, most preferably of 10 to 35 wt % or of 15 to 30 wt %, based in each case on the total weight of the electrodeposition coating material. The solids content, in other words the nonvolatile fraction, is determined in accordance with the method described hereinafter.

The electrodeposition coating material of the invention preferably has a pH in the range from 2.0 to 10.0, more preferably in the range from 2.5 to 9.5 or in the range from 2.5 to 9.0, very preferably in the range from 3.0 to 8.5 or in the range from 3.0 to 8.0, more particularly in the range from 2.5 to 7.5 or in the range from 3.5 to 7.0, especially preferably in the range from 4.0 to 6.5, most preferably in the range from 3.5 to 6.5 or from 5.0 to 6.0.

The electrodeposition coating material of the invention includes component (a) preferably in an amount in a range from 15 to 85 wt %, more preferably from 20 to 80 wt %, very preferably from 25 to 77.5 wt %, more particularly from 30 to 75 wt % or from 35 to 75 wt %, most preferably from 40 to 70 wt % or from 45 to 70 wt % or from 50 to 70 wt %, based in each case on the total solids content of the electrodeposition coating material.

The electrodeposition coating material of the invention includes component (a) preferably in an amount in a range from 1 to 40 wt %, more preferably from 2.5 to 37.5 wt %, very preferably from 4 to 35 wt %, more particularly from 5.5 to 32.5 wt %, most preferably from 7 to 30 wt % or from 8 to 25 wt %, based in each case on the total weight of the electrodeposition coating material.

The electrodeposition coating material of the invention includes component (b) preferably in an amount in a range from 0.2 to 20 wt %, more preferably from 0.5 to 17.5 wt %, very preferably from 0.75 to 15 wt %, more particularly from 1.0 to 12.5 wt %, most preferably from 1.0 to 10 wt % or from 1.0 to 9 wt %, based in each case on the total weight of the electrodeposition coating material.

The electrodeposition coating material of the invention includes component (c) preferably in an amount in the range from 5 to 45 wt %, more preferably from 6 to 42.5 wt %, very preferably from 7 to 40 wt %, more particularly from 8 to 37.5 wt % or from 9 to 35 wt %, most preferably from 10 to 35 wt %, especially preferably from 15 to 35 wt %, based in each case on the total solids content of the electrodeposition coating material.

The electrodeposition coating material of the invention includes component (c) preferably in an amount in an amount in a range from 0.5 to 30 wt %, more preferably from 1 to 25 wt %, very preferably from 1.5 to 20 wt %, more particularly from 2 to 17.5 wt %, most preferably from 2.5 to 15 wt %, especially preferably from 3 to 10 wt %, based in each case on the total weight of the electrodeposition coating material.

The electrodeposition coating material of the invention preferably includes no component which has olefinically unsaturated double bonds. More particularly neither of components (a) and (c) of the electrodeposition coating material of the invention contains olefinically unsaturated double bonds.

The fractions in wt % of all of the components (a), (b), (c), and water included in the electrodeposition coating material of the invention, and also of further components that may be present additionally, add up to 100 wt %, based on the total weight of the electrodeposition coating material.

The relative weight ratio of components (a) and (c) to one another in the electrodeposition coating material of the invention is preferably in a range from 5:1 to 1.1:1, more preferably in a range from 4.5:1 to 1.1:1, very preferably in a range from 4:1 to 1.2:1, more particularly in a range from 3:1 to 1.5:1.

The at least one epoxide-amine-adduct (a) is present preferably in the electrodeposition coating material in an amount of 50 to 70 wt %, based on the total solids content of the electrodeposition coating material, and the at least one crosslinking agent (c) is preferably present in the electrodeposition coating material in an amount of 10 to 35 wt %, based on the total solids content of the electrodeposition coating material.

The electrodeposition coating material of the invention preferably contains no OH-functional copolymer which contains at least one structural unit which in turn has at least one amino group, and more particularly no such copolymer which is prepared by copolymerization of monomers containing vinyl groups.

Component (a)

Component (a) of the electrodeposition coating material of the invention comprises at least one epoxide-amine adduct.

An epoxide-amine adduct for the purposes of the present invention is a reaction product of at least one epoxy resin and at least one amine. Epoxy resins used are more particularly those based on bisphenol A and/or derivatives thereof. Amines reacted with the epoxy resins are primary and/or secondary amines or salts thereof and/or salts of tertiary amines.

The at least one epoxide-amine adduct (a) is preferably a cationic, epoxide-based and amine-modified resin. The preparation of such cationic, amine-modified, epoxide-based resins is known and is described for example in DE 35 18 732, DE 35 18 770, EP 0 004 090, EP 0 012 463, EP 0 961 797 B1, and EP 0 505 445 B1. Cationic, epoxide-based, amine-modified resins are understood preferably to be reaction products of at least one polyepoxide having preferably two or more, e.g., three, epoxide groups, and at least one amine, preferably at least one primary and/or secondary amine. Particularly preferred polyepoxides are polyglycidyl ethers of polyphenols that are prepared from polyphenols and epihalohydrins. Polyphenols used may in particular be bisphenol A and/or bisphenol F. Other suitable polyepoxides are polyglycidyl ethers of polyhydric alcohols, such as, for example, of ethylene glycol, diethylene glycol, triethylene glycol, propylene 1,2-glycol, propylene 1,4-glycol, 1,5-pentanediol, 1,2,6-hexanetriol, glycerol, and 2,2-bis(4-hydroxycyclohexyl)propane. The polyepoxide used may also be a modified polyepoxide. Modified polyepoxides are understood to be those polyepoxides in which some of the reactive functional groups have been reacted with at least one modifying compound. Examples of such modifying compounds are as follows:

i) compounds containing carboxyl groups, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid, or dimeric fatty acids), hydroxyalkyl carboxylic acids (e.g., lactic acid, dimethylolpropionoic acid), and carboxyl-containing polyesters, or ii) compounds containing amino groups, such as diethylamine or ethylhexylamine or diamines with secondary amino groups, e.g., N,N'-dialkylalkylene-diamines, such as dimethylethylenediamine, N,N'-dialkyl-polyoxyalkyleneamines, such as N,N'-dimethylpolyoxypropylenediamine, cyanoalkylated alkylenediamines, such as bis-N,N'-cyanoethylethylenediamine, cyanalkylated polyoxyalkyleneamines, such as bis-N,N'-cyanoethyl-polyoxypropylenediamine, polyaminoamides, such as, for example, Versamides, especially amino-terminated reaction products of diamines (e.g., hexamethylenediamine), polycarboxylic acids, especially dimer fatty acids and monocarboxylic acids, more particularly fatty acids, or the reaction product of one mole of diaminohexane with two moles of monoglycidyl ether or monoglycidyl ester, especially glycidyl esters of α-branched fatty acids, such as Versatic acid, or iii) compounds containing hydroxyl groups, such as neopentyl glycol, bisethoxylated neopentyl glycol, neopentyl glycol hydroxypivalate, dimethylhydantoin-N,N'-diethanol, hexane-1,6-diol, hexane-2,5-diol, 1,4-bis(hydroxymethyl) cyclohexane, 1,1-isopropylidenebis(p-phenoxy)-2-propanol, trimethylolpropane, pentaerythritol or amino alcohols, such as triethanolamine, methyldiethanolamine, or hydroxyl-group-containing alkylketimines, such as aminomethylpropane-1,3-diol methylisobutylketimine or tris (hydroxymethyl)aminomethane cyclohexanoneketimine, and also polyglycol ethers, polyester polyols, polyether polyols, polycaprolactone polyols, polycaprolactam polyols of various functionalities and molecular weights, or iv) saturated or unsaturated fatty acid methyl esters, which are esterified with hydroxyl groups of the epoxy resins in the presence of sodium methoxide.

Examples of amines which can be used for preparing component (a) are mono- and dialkylamines, such as methylamine, ethylamine, propylamine, butylamine, dimethylamine, diethylamine, dipropylamine, methyl-butylamine, alkanolamines, such as methylethanolamine or diethanolamine, dialkylaminoalkylamines, such as dimethylaminoethylamine, diethylaminopropylamine, or dimethylaminopropylamine, for example. The amines which can be used may also include other functional groups as well, provided they do not disrupt the reaction of the amine with the epoxide group of the optionally modified polyepoxide and also do not lead to gelling of the reaction mixture. Secondary amines are preferably used. The charges that are needed for dilutability with water and for electrical deposition may be generated by protonation with water-soluble acids (e.g., boric acid, formic acid, acetic acid, lactic acid; preferably acetic acid). A further way of introducing cationic groups into the optionally modified polyepoxide is to react epoxide groups of the polyepoxide with amine salts.

The epoxide-amine adduct which can be used as component (a) is preferably a reaction product of an epoxy resin based on bisphenol A and primary and/or secondary amines or salts thereof and/or the salt of a tertiary amine.

Component (b)

Component (b) of the electrodeposition coating material of the invention comprises at least one pigment and/or at least one filler. Preferably the electrodeposition coating material of the invention comprises at least one pigment and at least one filler as component (b).

The term "filler" is known to the skilled person, from DIN 55943 (date: October 2001), for example. A "filler" for the purposes of the present invention is preferably a component which is substantially, preferably entirely, insoluble in the application medium, such as the electrodeposition coating material of the invention, for example, and which is used in particular for increasing the volume. "Fillers" in the sense of the present invention preferably differ from "pigments" in their refractive index, which for fillers is <1.7.

The term "pigment" is likewise known to the skilled person, from DIN 55943 (date: October 2001), for example. A "pigment" in the sense of the present invention refers preferably to components in powder or flake form which are substantially, preferably entirely, insoluble in the medium surrounding them, such as the electrodeposition coating material of the invention, for example. They are preferably colorants and/or substances which can be used as pigment on account of their magnetic, electrical and/or electromagnetic properties. Pigments differ from "fillers" preferably in their refractive index, which for pigments is ≥1.7.

Any customary filler known to the skilled person may be used as component (b). Examples of suitable fillers are kaolin, dolomite, calcite, chalk, calcium sulfate, barium sulfate, graphite, silicates such as magnesium silicates, especially corresponding phyllosilicates such as hectorite, bentonite, montmorillonite, talc and/or mica, silicas, especially fumed silicas, hydroxides such as aluminum hydroxide or magnesium hydroxide, or organic fillers such as textile fibers, cellulose fibers, polyethylene fibers or polymer powders; for further details, reference is made to Römpp Lexikon Lacke und Druckfarben, Georg Thieme Verlag, 1998, pages 250 ff., "Fillers".

Any customary pigment known to the skilled person may be used as component (b). Examples of suitable pigments are inorganic and organic coloring pigments. Examples of suitable inorganic coloring pigments are white pigments such as zinc white, zinc sulfide or lithopone; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate. Further inorganic coloring pigments are silicon dioxide, aluminum oxide, aluminum oxide hydrate, especially boehmit, titanium dioxide, zirconium oxide, cerium oxide, and mixtures thereof. Examples of suitable organic coloring pigments are monoazo pigments, disazo pigments, anthraquinone pigments, benzimidazole pigments, quinoacridone pigments, quinophthalone pigments, diketopyrrolopyrrol pigments, dioxazine pigments, indanthrone pigments, isoindoline pigments, isoindolinone pigments, azomethine pigments, thioindigo pigments metal complex pigments, perinone pigments, perylene pigments, phthalocyanine pigments or aniline black.

Component (b) is preferably incorporated in the form of a pigment paste and/or filler paste into the electrodeposition coating material. Such pastes typically include at least one polymer used as grinding resin. Preferably, therefore, there is at least one such polymer used as grinding resin included in the electrodeposition coating material of the invention. The resin in question is preferably likewise an epoxide-amine adduct, which in this case corresponds to and/or should be subsumed within component (a). The polymer used as grinding resin preferably has building blocks which interact with the surfaces of the pigments and/or fillers. The grinding resins therefore have the effect of an emulsifier. In many cases quaternary ammonium compounds are incorporated for the purpose of improving the grinding resin properties. The pigments and/or fillers are preferably ground together with a grinding resin to form a pigment paste. To produce the finished electrodeposition coating material, this paste is mixed with the rest of the constituents. The use of a pigment paste leads advantageously to a greater flexibility in electrodeposition coating, since the pigment and binder fraction of the electrodeposition coating material can be readily adapted at any time to the requirements of practice via the amount of the pigment paste.

Where the electrodeposition coating material of the invention comprises at least one polymer used as grinding resin which is not an epoxide-amine adduct and is therefore different from component (a), said polymer is included preferably in an amount in a range from 0.5 to 10 wt %, more preferably from 0.5 to 7.5 wt %, very preferably from 0.75 to 5 wt % in the electrodeposition coating material, based in each case on the total weight of the electrodeposition coating material.

Component (c)

Component (c) of the electrodeposition coating material of the invention comprises at least one crosslinking agent, a fraction of at least 25 wt % of the crosslinking agent (c) based on the total weight of the crosslinking agent (c), being formed by at least one tris(alkoxycarbonylamino)-1,3,5-triazine and any remaining fraction—i.e., the fraction possibly remaining within the crosslinking agent of 75 wt % at most, based on the total weight of the crosslinking agent (c)—is formed by at least one crosslinking agent which is different from the at least one tris(alkoxycarbonylamino)-1, 3,5-triazine and is selected from the group consisting of blocked polyisocyanates, amino resins, and mixtures thereof. In other words, at least 25 wt % of the crosslinking agent (c), based on the total weight of the crosslinking agent (c), in the electrodeposition coating material of the invention is present in the form of at least one tris(alkoxycarbonylamino)-1,3,5-triazine. 75 wt % at most of the crosslinking agent (c), based on the total weight of the crosslinking agent (c), is present in the electrodeposition coating material of the invention in the form of at least one crosslinking agent which is different from the at least one tris(alkoxycarbonylamino)-1,3,5-triazine and is selected from the group consisting of blocked polyisocyanates, amino resins, and mixtures thereof. The fraction of tris(alkoxycarbonylamino)-1, 3, 5-triazine may be up to 100 wt %, based on the total weight of the crosslinking agent (c) in the electrodeposition coating material. The electrodeposition coating material of the invention preferably contains no crosslinking agents other than the at least one crosslinking agent (c).

The term "blocked polyisocyanates" is known to the skilled person. Blocked polyisocyanates which can be utilized are polyisocyanates having at least two isocyanate groups (diisocyanates), but preferably having more than two, such as, for example, 3 to 5 isocyanate groups, wherein the isocyanate groups have been reacted, so that the blocked polyisocyanate formed is stable in particular with respect to hydroxyl groups and amino groups such as primary and/or secondary amino groups at room temperature, i.e., at a temperature of 18 to 23° C., but at elevated temperatures, as for example at ≥80° C., ≥110° C., ≥130° C. or ≥140° C., reacts with conversion and with formation of urethane and/or urea bonds, respectively.

In the preparation of the blocked polyisocyanates it is possible to use any desired organic polyisocyanates suitable for crosslinking. Isocyanates used preferably are (hetero) aliphatic, (hetero)cycloaliphatic, (hetero)aromatic or (hetero)aliphatic-(hetero)aromatic isocyanates. Preferred polyisocyanates are those containing 2 to 36, especially 6 to 15, carbon atoms. Preferred examples are ethylene 1,2-ethylene diisocyanate, tetramethylene 1,4-diisocyanate, hexamethylene 1,6-diisocyanate (HDI), 2,2,4(2,4,4)-tri-methylhexamethylene 1,6-diisocyanate (TMDI), diphenylmethane diisocyanate (MDI), 1,9-diisocyanato-5-methylnonane, 1,8-diisocyanato-2,4-dimethyloctane, dodecane 1,12-diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2, 3,5,6-tetramethyl-cyclohexane, decahydro-8-methyl(1,4-methanonaphthalen-2 (or 3),5-ylenedimethylene diisocyanate, hexahydro-4,7-methanoindan-1 (or 2),5 (or 6)-ylenedimethylene diisocyanate, hexahydro-4,7-methanoindan-1 (or 2),5 (or 6)-ylene diisocyanate, hexahydrotolylene 2,4- and/or 2,6-diisocyanate (H6-TDI), toluene 2,4- and/or 2,6-diisocyanate (TDI), perhydrodiphenylmethane 2,4'-diisocyanate, perhydrodiphenylmethane 4,4'-diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-di-isocyanatomethyl-2,3,5,6-tetramethylbenzene, 2-methyl-1,5-diisocyanatopentane (MPDI), 2-ethyl-1,4-diiso-cyanatobutane, 1,10-diisocyanatodecane, 1,5-diiso-cyanatohexane, 1,3-diisocyanatomethylcyclohexane, 1,4-diisocyanatomethylcyclohexane, 2,5(2,6)-bis(isocyanato-methyl)bicyclo[2.2.1]heptane (NBDI), and also any mixture of these compounds. Polyisocyanates of higher isocyanate functionality may also be used. Examples thereof are trimerized hexamethylene diisocyanate and trimerized isophorone diisocyanate, more particularly the corresponding isocyanurates. It is also possible, furthermore, to utilize mixtures of polyisocyanates.

For the blocking of the polyisocyanates it is possible with preference to use any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols, such as cyclopentanol and cyclohexanol; aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

Amino resins (aminoplast resins) are likewise known to the skilled person. Amino resins used are preferably melamine resins, more particularly melamine-formaldehyde resins, which are likewise known to the skilled person. Preference, however, is given to using no amino resins such as melamine-formaldehyde resins as crosslinking agents (c). The electrodeposition coating material of the invention therefore preferably comprises no amino resins such as melamine-formaldehyde resins.

Tris(alkoxycarbonylamino)-1,3,5-triazine (TACT) are likewise known to the skilled person. The use of tris(alkoxycarbonylamino)-1,3,5-triazines as crosslinking agents in coating material compositions is known. For example, DE 197 12 940 A1 describes the use of such crosslinking agents in basecoat materials. U.S. Pat. No. 5,084,541 describes the preparation of corresponding compounds which can be used as component (c).

Preferably said at least one tris(alkoxycarbonylamino)-1,3,5-triazine comprises at least one tris(alkoxycarbonylamino)-1,3,5-triazine of the general formula (I)

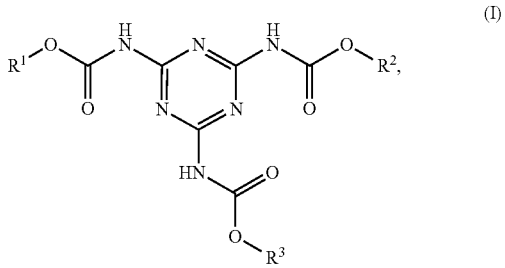

in which the radicals $R^1$, $R^2$, and $R^3$ each independently of one another are $C_1$-$C_8$ alkyl groups, more preferably each independently of one another $C_1$-$C_6$ alkyl groups, very preferably each independently of one another $C_1$-$C_4$ alkyl groups. Also possible here are mixed esters—that is $R^1$ and $R^2$ may for example each be methyl and $R^3$ n-butyl, or $R^1$ and $R^2$ may for example each be n-butyl and $R^3$ methyl. In particular, however, each of the radicals $R^1$, $R^2$, and $R^3$ is n-butyl.

Examples of suitable tris(alkoxycarbonylamino)-1,3,5-triazines which can be used as component (c) are tris(methoxycarbonylamino)-, tris(butoxycarbonylamino)-, and tris(2-ethylhexoxycarbonylamino)-1,3,5-triazines and also mixtures thereof. Especially preferred is tris(butoxycarbonylamino)-1,3,5-triazine.

Preferably a fraction of at least 30 wt %, more preferably of at least 35 wt %, very preferably of at least 40 wt %, more preferably still of at least 45 wt %, more preferably in turn of at least 50 wt % of the crosslinking agent (c), based in each case on the total weight of the crosslinking agent (c), is formed by at least one tris(alkoxycarbonylamino)-1,3,5-triazine. The remaining fraction where appropriate in each case within the crosslinking agent is formed by at least one crosslinking agent which is different from the at least one tris(alkoxycarbonylamino)-1,3,5-triazine and is selected from the group consisting of blocked polyisocyanates. The maximum fraction of tris(alkosycarbonylamino)-1,3,5-triazine is preferably in each case 100 wt % or less <100 wt % based in each case on the total weight of the crosslinking agent (c).

In further preferred embodiments, a fraction of at least 55 wt %, more preferably of at least 60 wt %, very preferably at least 65 wt %, more preferably still of at least 70 wt % or of at least 80 wt %, more preferably in turn of at least 85 wt % or of at least 90 wt % or of at least 95 wt % or of at least 100 wt % of the crosslinking agent (c), based in each case on the total weight of the crosslinking agent (c), is formed by at least one tris(alkoxycarbonylamino)-1,3,5-triazine. The maximum fraction of tris(alkoxycarbonylamino)-1,3,5-triazine is preferably in each case 100 wt % or <100 wt % based in each case on the total weight of the crosslinking agent (c).

The electrodeposition coating material of the invention is used preferably as a one-component (1K) coating composition. For this reason, the electrodeposition coating material of the invention preferably contains no free polyisocyanates.

Other Optional Components

The electrodeposition coating material of the invention may include phosphate as component (d). In principle, the presence of phosphates in the electrodeposition coating material of the invention is unwanted. Contamination with phosphate, however, is often unavoidable, since the substrates to be coated are generally phosphated, by means of zinc phosphating, for example, in an upstream pretreatment step ahead of the electrodeposition coating, with the aim of further improving the corrosion control. Since it is difficult to free the substrates completely from adhering phosphates by means of a cleaning step, phosphates are often carried as impurities into the electrodeposition coating bath (phosphate entrainment).

The electrodeposition coating material of the invention may include phosphate in an amount in a range from up to 5000 ppm such as, for example, from 1 to 5000 ppm, although, as mentioned above, the presence of phosphate is undesirable. The fraction of phosphate in the electrodeposition coating material of the invention here may be determined by means of inductively coupled plasma-atomic emission spectrometry (ICP-OES) in accordance with DIN EN ISO 11885 (date: September 2009).

The electrodeposition coating material of the invention may, moreover, optionally comprise as component (e) a catalyst such as, for example, a metal-containing catalyst. In one preferred embodiment, however, the electrodeposition coating material of the invention includes no catalyst such as a metal-containing catalyst. The catalyst optionally included is preferably a bismuth-containing catalyst. With particular preference it is possible to use a bismuth-containing catalyst, such as, for example, bismuth(III) oxide, basic bismuth(III) oxide, bismuth(III) hydroxide, bismuth(III) carbonate, bismuth(III) nitrate, bismuth(III) subnitrate (basic bismuth(III) nitrate), bismuth(III) salicylate and/or bismuth(III) subsalicylate (basic bismuth(III) salicylate), and also mixtures thereof. Especially preferred are water-insoluble, bismuth-containing catalysts. Preferred more particularly is bismuth(III) subnitrate. The electrodeposition coating material of the invention preferably includes at least one bismuth-containing catalyst in an amount such that the bismuth(III) content, calculated as bismuth metal, based on the total weight of the electrodeposition coating material of the invention, is in a range from 10 ppm to 20 000 ppm. The amount of bismuth, calculated as metal, may be determined by means of inductively coupled plasma-atomic emission spectrometry (ICP-OES) in accordance with DIN EN ISO 11885 (date: September 2009).

Depending on desired application, the electrodeposition coating material of the invention may comprise one or more commonly employed further additives. Preferably these additives are selected from the group consisting of wetting agents, emulsifiers, dispersants, surface-active compounds such as surfactants, flow control assistants, solubilizers, defoamers, rheological assistants, antioxidants, stabilizers, preferably heat stabilizers, process stabilizers, and UV and/or light stabilizers, flexibilizers, plasticizers, and mixtures of the aforesaid additives. The additive content may vary very widely according to intended use. The additive content, based on the total weight of the electrodeposition coating material of the invention, is preferably 0.1 to 20.0 wt %, more preferably 0.1 to 15.0 wt %, very preferably 0.1 to 10.0 wt %, especially preferably 0.1 to 5.0 wt %, and more particularly 0.1 to 2.5 wt %.

Method for Electrocoating

A further subject of the present invention is a method for at least partially coating an electrically conductive substrate by cathodic electrodeposition coating, in which
(1) the electrically conductive substrate is immersed at least partially into an electrodeposition coating bath which comprises the electrodeposition coating material of the invention,
(2) the substrate is connected as cathode,
(3) a coating film is deposited on the substrate using direct current,
(4) the coated substrate is removed from the electrodeposition coating bath, and
(5) the coating film deposited on the substrate is baked.

All preferred embodiments described hereinabove in connection with the electrodeposition coating material of the invention are also preferred embodiments with regard to the aforesaid method of the invention using this electrodeposition coating material for at least partially coating an electrically conductive substrate by cathodic electrodeposition coating.

The method of the invention is particularly suitable for the electrodeposition coating of motor vehicle bodies or parts thereof. Consequently, the preferred substrates are motor vehicle bodies or parts thereof.

Suitability as electrically conductive substrate used in accordance with the invention is possessed by all electrically conductive substrates used customarily and known to the skilled person. The electrically conductive substrates used in accordance with the invention are preferably selected from the group consisting of steel, preferably steel selected from the group consisting of cold rolled steel, hot rolled steel, galvanized steel such as hot dip galvanized steel, alloy galvanized steel (such as, for example, Galvalume, Galvannealed or Galfan) and aluminized steel, aluminum and magnesium, and also Zn/Mg alloys and Zn/Ni alloys. Particularly suitable substrates are parts of vehicle bodies or complete bodies of automobiles for production.

Before the respective electrically conductive substrate is used in step (1), it is preferably cleaned and/or degreased.

The electrically conductive substrate used in accordance with the invention is preferably a substrate pretreated with at least one metal phosphate such as zinc phosphate. A pretreatment of this kind by means of phosphating, which takes place normally after the substrate has been cleaned and before the substrate is electrodeposition-coated in step (1), is in particular a pretreatment step that is customary in the automobile industry.

During performance of steps (1), (2), and (3) of the method of the invention, the electrodeposition coating material of the invention is deposited cathodically on the region of the substrate immersed into the bath in step (1). In step (2), the substrate is connected as the cathode, and an electrical voltage is applied between the substrate and at least one counterelectrode, which is located in the deposition bath or is present separately from it, for example by way of an anion exchange membrane which is permeable for anions. The counterelectrode functions, accordingly, as an anode. On passage of electrical current between anode and cathode, a firmly adhering coating film is deposited on the cathode, i.e., on the immersed part of the substrate. The voltage applied here is preferably in a range from 50 to 500 volts. On performance of steps (1), (2), and (3) of the method of the invention, the electrodeposition coating bath preferably has a bath temperature in a range from 20 to 45° C.

The baking temperature in step (5) is preferably in a range from 120 to 185° C., more preferably from 120 to 180° C., very preferably from 120 to 175° C., more particularly from 125 to 170° C. or from 125° C. to 165° C., most preferably from 130 to 165° C. or from 130 to 160° C.

Substrate

A further subject of the present invention is an electrically conductive substrate which is coated at least partially with a baked electrodeposition coating material of the invention.

All preferred embodiments described hereinabove in connection with the electrodeposition coating material of the invention and the method of the invention are also preferred embodiments with regard to the aforesaid at least partially coated substrate of the invention.

Use

A further subject of the present invention is a use of at least one tris(alkoxycarbonylamino)-1,3,5-triazine in a cathodically depositable electrodeposition coating material in a fraction of at least 25 wt %, based on the total weight of crosslinking agents in the electrodeposition coating material, for reducing or eliminating the sensitivity to disruption of the electrodeposition coating bath toward impurities present therein through phosphates and/or through other metal salts which have been carried into the electrodeposition coating bath as a result of pretreatment steps ahead of the electrodeposition coating, such as in particular an upstream phosphating, and/or for lowering the baking temperature of the electrodeposition coating material in the case of at least partial coating of an electrically conductive substrate to a temperature in a range from 125° C. to 165°, more preferably from 130 to 165° C. or from 130 to 160° C. The cathodically depositable electrodeposition coating material here is preferably the electrodeposition coating material of the invention, i.e., an electrodeposition coating material which, in addition to components (a) and (b), includes at least one crosslinking agent (c), a fraction of at least 25 wt % of the crosslinking agent (c), based on the total weight of the crosslinking agent (c), being formed by at least one tris(alkoxycarbonylamino)-1,3,5-triazine, and any remaining fraction being formed by at least one crosslinking agent which is different from the at least one tris(alkoxycarbonylamino)-1,3,5-triazine and which is selected from the group consisting of blocked polyisocyanates, amino resins, and mixtures thereof. Employed preferably as tris(alkoxycarbonylamino)-1,3,5-triazine is at least one tris(alkoxycarbonylamino)-1,3,5-triazine of the general formula (I) shown above.

All preferred embodiments described hereinabove in connection with the electrodeposition coating material of the invention, the method of the invention, and the at least partially coated substrate of the invention are also preferred embodiments with regard to the aforesaid use of the at least one tris(alkoxycarbonylamino)-1,3,5-triazine in a cathodically depositable electrodeposition coating material.

Methods of Determination

1. Determining the Nonvolatile Fraction

The nonvolatile fraction (the solids or solids content) is determined in accordance with DIN EN ISO 3251 (date: June 2008). This involves weighing out 1 g of sample into an aluminum dish which has been dried beforehand and drying the dish with sample in a drying cabinet at 130° C. for 60 minutes, cooling it in a desiccator, and then reweighing. The residue, relative to the total amount of sample employed, corresponds to the nonvolatile fraction.

2. Determining the Average Particle Size

The average particle size is determined by dynamic light scattering (photon correlation spectroscopy) (PCS) in a method based on DIN ISO 13321 (date: October 2004). The average particle size here is the measured mean particle diameter (Z-average mean). Measurement takes place using a "Malvern Nano S90" (from Malvern Instruments) at 25±1° C. The instrument covers a size range of 3 to 3000 nm and is equipped with a 4 mW He—Ne laser at 633 nm. The respective samples are diluted with a dispersion medium of particle-free deionized water and are then measured at appropriate scattering intensity in a 1 ml polystyrene cuvette. Evaluation was carried out with a digital correlator, with the aid of the Zetasizer Vers. 7.11 evaluation software (from Malvern Instruments). Measurement is carried out five times, and the measurements are repeated on a second, freshly prepared sample. The average particle size referred to presently is the arithmetic volume mean of the measured average particle diameter (V-average mean). The standard deviation of a 5-fold determination in this case is ≤4%. The result is verified using polystyrene standards having certified particle sizes of between 100 to 200 nm.

3. Determining the Glass Transition Temperatures

The glass transition temperature $T_g$ is determined experimentally in a method based on DIN 51005 (date: August 2005) "Thermische Analyse (TA)—Terms" and DIN 53765 (date: March 1994) "Thermische Analyse—Differential Scanning Calorimetry (DCS)". It involves weighing out a sample of 15 mg into a sample boat and introducing the boat with sample into a DSC instrument. Cooling takes place to the starting temperature, after which a $1^{st}$ and $2^{nd}$ measurement run are carried out with inert gas blanketing ($N_2$) of 50 ml/min with a heating rate of 10 K/min, the sample being cooled back down to the starting temperature between the runs. Measurement takes place in the temperature range from about 50° C. lower than the anticipated glass transition temperature up to about 50° C. higher than the anticipated glass transition temperature. The glass transition temperature, in accordance with DIN 53765, section 8.1, is the temperature in the $2^{nd}$ measuring run at which half of the change in the specific peak capacity (0.5 delta cp) is reached. It is ascertained from the DSC diagram (a plot of the heat flow against the temperature). It is the temperature which corresponds to the point of intersection of the center line between the extrapolated baselines before and after the glass transition with the measurement plot. For a useful estimation of the glass transition temperature to be anticipated in the measurement, it is possible to employ the known equation of Fox. Since the Fox equation represents a good approximation, based on the glass transition temperatures of the homopolymers and their parts by weight, without including the molecular weight, it can be used as a useful tool for the skilled person in synthesis, allowing a desired glass transition temperature to be set by way of a few goal-oriented tests.

4. Determining the Solvent Resistance by the MEK Test Based on DIN EN 13523-11 (Date: September 2011)

The MEK test serves to determine the resistance of coating films to organic solvents (rub test). A piece of cotton compress (Art. No. 1225221 from Römer Apotheke Rheinberg) is affixed with a rubber band to the head of an MEK hammer and then soaked with MEK (methyl ethyl ketone) as solvent. The hammer weighs 1200 g and has a handle with a placement area of 2.5 $cm^2$. The hammer is likewise filled with solvent, which runs continuously into the cotton compress. This ensures that the compress is dripping wet throughout the test. A metal test sheet is rubbed once back and forth (=1 DR, one double rub (back-and-forth stroke)) with the compress, this sheet being like one of the metal test sheets used in the examples. The test distance here is 9.5 cm. 1 DH is to be performed here in 1 s. No additional force is exerted on the hammer during this procedure. The top and bottom points of reversal at the edges of the metal test sheet are not evaluated. A count is made of the DRs needed in order to erode the entire coating film on the test sheet down to the substrate, and this figure is reported. If such erosion is not achieved by the time a maximum of 100 DRs have been reached, the test is discontinued after a maximum of 100 DRs.

5. Determination of Corrosion Resistance

The corrosion resistance of coatings is determined by a salt spray mist test. The salt spray mist testing is carried out according to DIN EN ISO 9227 NSS (date: September 2012) for the coated substrate under study. The samples under study are accommodated in a chamber in which at a temperature of 35° C., continuously over a duration of 360 hours, a mist is produced from a 5% strength sodium chloride solution with a controlled pH in the range from 6.5 to 7.2. The mist deposits on the samples under study and covers them with a corrosive salt water film.

Following performance of the salt spray mist testing according to DIN EN ISO 9227 NSS, the rust coverage (surface rust) of the samples is investigated according to DIN EN ISO 4628-3 (date: January 2004). The rust coverage is assessed according to ratings (0=rust-free, 1=about 1% rust coverage, 2=about 3% rust coverage, 3=about 10% rust coverage, 4=about 30% rust coverage, and 5=about 50% rust coverage).

If, still prior to the salt spray mist testing according to DIN EN ISO 9227 NSS, the coating on the samples under study is scored down to the substrate with a blade incision, the samples can be investigated for their level of corrosive undermining to DIN EN ISO 4628-8 (date March 2013), since the substrate corrodes along the score line during the DIN EN ISO 9227 NSS salt spray mist testing. As a result of the progressive process of corrosion, the coating is undermined to a greater or lesser extent during the test. The extent of undermining in [mm] is a measure of the resistance of the coating to corrosion.

6. Determining the Weather Resistance

The weather resistance is determined by subjecting the coated samples under study, without a topcoat system, for 240 h in succession to weathering according to DIN EN ISO 16474-1 (date: March 2014), DIN EN ISO 16474-2 (date: March 2014), DIN EN ISO 4892-1 (date: March 2014), and DIN EN ISO 4892-2 (date: June 2013). Before and after the weathering, the gloss of the coating was measured using the Micro-TRI-Gloss instrument from Byk-Gardner. Likewise before and after weathering, the color value b (CIELAB at 45°; unweighted) was determined using the X-Rite MA60 instrument.

Inventive and Comparative Examples

The inventive and comparative examples which follow serve to elucidate the invention but should not be interpreted restrictively. Unless otherwise indicated, the amounts in parts are parts by weight, and amounts in percent are in each case percentages by weight.

1. Preparation of a Noninventively Used Crosslinking Agent V1

The crosslinking agent V1 is prepared as described in WO 2009/021719 A2 on page 10, lines 1 to 13 in section 1.1 within example 1. V1 is a conventional blocked polyisocyanate.

2. Preparation of Mixtures of Epoxide-Amine Adducts and Crosslinking Agent 2.1 Preparation of an Aqueous Binder Dispersion D1 (Noninventive)

The aqueous binder dispersion D1 is prepared as described in DE 197 03 869 A1, example 2.3 (binder dispersion C), page 7, line 59 to page 8, line 26, i.e., using the crosslinking agent V1.

2.2 Preparation of the Aqueous Binder Dispersion D2 (Inventive)

The aqueous binder dispersion D2 is prepared as described in section 2.1 in connection with the binder dispersion D1, with reference to the corresponding passages of DE 197 03 869 A1, but, instead of the 812 parts of crosslinking agent V1, stirring in 812 parts of a tris(alkoxycarbonylamino)triazine crosslinker, namely the commercially available product HTB-S from HOS-Technik GmbH. The resulting dispersion D2 has a solids content of 45.5 wt % and a pH of 6.0. The average particle size of the particles present in the dispersion is 140 nm.

3. Production of Pigment Pastes 3.1 Production of a Grinding Resin Dispersion R1

According to EP 0 505 445 B1, example 1.3 (grinding resin A 3), page 9, lines 29-49, a grinding resin is produced. In accordance with the preparation described in the aforesaid publication, the resin is additionally neutralized and diluted with 2.82 parts of glacial acetic acid and 13.84 parts of deionized water. This lowers the solid content of the resulting grinding resin dispersion to 60 wt %.

3.2 Production of the Aqueous Pigment Paste P1

The components listed in table 1 below are added in succession to a high-speed dissolver stirrer and mixed for a time of 30 minutes:

TABLE 1

| Parts by weight | Component |
| --- | --- |
| 32.3 | deionized water |
| 24.1 | grinding resin dispersion R1 |
| 5.6 | aluminum silicate extender (ASP 2001) |
| 0.6 | carbon black |
| 32.7 | titanium dioxide (Ti-PURE R 900, DuPont) |
| 4.7 | bismuth subnitrate (Bi content 71-74%) |
| Σ100 | |

The mixture is subsequently dispersed in a laboratory agitator mill over a time of 1-2 h to a Hegman fineness of 12 μm and is adjusted where appropriate to the desired processing viscosity with additional demineralized water.

3.3 Production of the Aqueous Pigment Paste P2

The aqueous pigment paste P2 is produced as described in section 3.2 in connection with the pigment paste P1, although P2 contains no bismuth subnitrate. Instead, 37.4 parts by weight of titanium dioxide are used in place of 32.7 parts by weight for the production of P2.

4. Production of Electrocoat Materials 4.1 The components listed in table 2 below are processed to give cathodically depositable electrocoat materials (ETL1 to ETL5). In each case, the particular binder dispersion used is introduced and diluted with deionized water, and, optionally, phosphoric acid is added. Then the respective pigment paste is introduced with stirring. The quantities in table 2 are parts by weight in each case. Electrocoat materials ETL1 and ETL3 are comparative examples. Electrocoat materials ETL2, ETL4, and ETL5 are inventive examples.

TABLE 2

| Components used | ETL1 | ETL2 | ETL3 | ETL4 | ETL5 |
| --- | --- | --- | --- | --- | --- |
| Binder dispersion D1 | 2110 | — | 2110 | — | — |
| Binder dispersion D2 | — | 2110 | — | 2110 | 2110 |
| Pigment paste P1 | 305 | 305 | 305 | 305 | — |
| Pigment paste P2 | — | — | — | — | 305 |
| Deionized water | 2585 | 2585 | 2580.9 | 2580.9 | 2585 |
| Phosphoric acid (85%) | — | — | 4.1 | 4.1 | — |

The use of phosphoric acid in the case of the production of ETL3 (in comparison to ETL1) and in the production of ETL4 (in comparison to the production of ETL2) serves to simulate (unwanted) phosphate entrainment: phosphate entrainment is usual in EC systems, since corresponding electrocoating baths typically include at least small amounts of phosphates if the substrate used is pretreated by phosphating (more than 95% of all pretreatments in the automobile industry are phosphating procedures).

4.2 100 wt % of the crosslinking agent of the inventive electrocoat material ETL4 is a tris(alkoxycarbonylamino)triazine crosslinker. 100 wt % of the crosslinking agent of the noninventive electrocoat material ETL3 is formed by a conventional blocked polyisocyanate. To investigate the effect of the portion of tris(alkoxycarbonylamino)triazine crosslinker in the electrocoat materials, different mixtures of ETL3 and ETL4 were produced in order to produce a series of further electrocoat materials, namely electrocoat materials ETL6 to ETL9.

The amounts of tris(alkoxycarbonylamino)triazine crosslinker (TACT) and crosslinking agent V1 within these electrocoat materials ETL6 to ETL9 are such that, based in each case on the total weight of all of the crosslinking agents used, in ETL6 the fraction of TACT is 20 wt % and the fraction of V1 is 80 wt %, in ETL7 the fraction of TACT is 30 wt % and the fraction of V1 is 70 wt %, in ETL8 the fraction of TACT is 40 wt % and the fraction of V1 is 60 wt %, and in ETL9 the fraction of TACT is 50 wt % and the fraction of V1 is likewise 50 wt %.

Electrocoat material ETL6 is therefore a noninventive electrocoat material, whereas ETL7 to ETL9 are inventive electrocoat materials.

5. Investigation and Testing of the Electrocoat Materials 5.1 Investigation of the Glass Transition Temperatures For determining the glass transition temperatures ($T_g$), films of the electrocoat materials ETL1, ETL2, and ETL5 are deposited on cathodically connected, phosphatized test panels over the course of 2 minutes with a deposition voltage of 220-350 V at a bath temperature of 28-34° C. The metal test sheets are subsequently baked at 175° C. (substrate temperature) for 15 minutes.

Thereafter the glass transition temperatures are determined in accordance with the method described above. The results are set out in table 3.

TABLE 3

|  | ETL1 (comparative) | ETL2 (inventive) | ETL5 (inventive) |
|---|---|---|---|
| Glass transition temperature [° C.] | 87 | 115 | 114 |

The results in table 3 show that the inventive electrocoat materials ETL2 and ETL5 exhibit a significantly higher glass transition temperature by comparison with the conventional product ETL1. Here it should be noted in particular that ETL5 is catalyst-free.

5.2 Investigation of the Crosslinking Status and the Solvent Resistance

For determining the crosslinking status, films of the electrocoat materials ETL1, and ETL2, are deposited on cathodically connected, phosphatized test panels over the course of 2 minutes with a deposition voltage of 220-350 V at a bath temperature of 28-34° C. The metal test sheets are subsequently baked at different substrate temperatures for 15 minutes. To test the crosslinking status of the baked coating films, a determination was made of the solvent resistance in accordance with DIN EN 13523-11 (date: September 2011) (MEK-Test, i.e., solvent resistance with respect to methyl ethyl ketone (MEK)) by the method described above. The results are set out in table 4.

TABLE 4

| Baking temperature [° C.] | ETL1 (comparative): number of double rubs (DR) | ETL2 (inventive) number of double rubs (DR) |
|---|---|---|
| 120 | 5 | 70 |
| 130 | 8 | 100 |
| 140 | 15 | 100 |
| 150 | 65 | 100 |
| 160 | 100 | 100 |
| 175 | 100 | 100 |

From the data it appears apparent that the crosslinking reaction in the inventive electrocoat material ETL2 is sufficient even at baking temperatures of 120° C., whereas baking temperatures of at least 150° C. are needed for the comparative example ETL1.

5.3 Investigating the Crosslinking Dynamics by Carbon Fiber Net

For determining the crosslinking onset temperature (beginning of crosslinking), coating films are deposited with the electrocoat materials ETL1 to ETL5 on a carbon fiber net within 2 minutes at a deposition voltage of 110-150 V at a bath temperature of 28-34° C. The crosslinking onset temperature is determined by introducing the nets into a DMA (dynamic mechanical analysis). The results are set out in table 5.

TABLE 5

| Inventive/comparative example | Onset temperature E' profile [° C.] |
|---|---|
| ETL1 (comparative) | 146 |
| ETL2 (inventive) | 116 |
| ETL3 (comparative) | 160 |
| ETL4 (inventive) | 116 |
| ETL5 (inventive) | 118 |

The results show that the crosslinking onset temperature of inventive examples ETL2, ETL4, and ETL5 is much lower (116° C.) than that of the conventional products ETL1 and ETL3 (146 and 160° C., respectively). As a result, the inventive examples ETL2, ETL4, and ETL5 can be crosslinked at temperatures even of around 120-130° C. Particularly noteworthy is the result for ETL5, since this coating material is catalyst-free (containing no bismuth subnitrate), but in terms of onset it nevertheless displays values comparable with that of the catalyzed system ETL2.

In table 6, moreover, the extrapolated crosslinking offset times (crosslinking duration) in minutes, obtained likewise by means of DMA analysis, are compared with one another at different temperatures. Investigated here in particular is the effect of phosphate present in the electrocoat materials on the required crosslinking duration. Entrainment of phosphate (through cavities, etc.) from the pretreatment is a frequent occurrence in the automobile lines, in spite of intense washing operations, and it therefore impairs the curing of the deposition coating, especially on mass parts, which heat up more slowly and to less of an extent.

TABLE 6

| | Extrapolated offset times [min] | | | |
|---|---|---|---|---|
| Measuring condition | ETL1 (comparative, containing no phosphate) | ETL2 (inventive, containing no phosphate) | ETL3 (comparative, containing phosphate) | ETL4 (inventive, containing phosphate) |
| 120° C. | no crosslinking | 53 | no crosslinking | 56 |
| 130° C. | no crosslinking | 38 | no crosslinking | 39 |
| 150° C. | no crosslinking | 22 | no crosslinking | 23 |
| 175° C. | 23 | 16 | 40 | 17 |

From a comparison of ETL4 and ETL2 according to table 6 it is apparent that the inventive electrocoat material ETL2 exhibits virtually no response to addition of phosphate (simulated in ETL4), whereas in the case of phosphate addition, as simulated by the comparative coating ETL3, the comparative coating ETL1 is very greatly restricted in its crosslinking, i.e., it requires significantly more time for crosslinking (40 minutes in the case of ETL3 at 175° C. rather than 23 minutes in the case of ETL1 at 175° C.).

Additionally to the onset and offset measurements according to tables 5 and 6, it is also possible to determine and compare the MEK double rubs as a measurement of solvent resistance with respect to the solvent MEK, as described in section 5.2, for determining the crosslinking status, and hence as a measure of crosslinking. In this case, coating films of the electrocoat materials ETL1 to ETL4 are deposited on cathodically connected, phosphatized test panels within 2 minutes with a deposition voltage of 220-350 V and a coating bath temperature of 28-34° C. The metal test panels are subsequently baked for 15 minutes at different substrate temperatures (150, 160 or 175° C.). To test the crosslinking status of the baked coating films, the solvent resistance was determined according to DIN EN 13523-11 (date: September 2011) (MEK test, i.e., solvent resistance with respect to methyl ethyl ketone (MEK)) by the method described above. The results are set out in table 7. The numerical figures represent the number of double rubs (DR) found.

TABLE 7

| Inventive/comparative example | 150° C. | 160° C. | 175° C. |
|---|---|---|---|
| ETL1 (comparative, containing no phosphate) | 65 | 100 | 100 |
| ETL3 (comparative, containing phosphate | 7 | 20 | 60 |
| ETL2 (inventive, containing no phosphate) | 100 | 100 | 100 |
| ETL4 (inventive, containing phosphate) | 100 | 100 | 100 |

From a comparison of ETL4 and ETL2 according to table 7 it can be seen that the inventive electrocoat material ETL2 displays no response to addition of phosphate (simulated in ETL4), whereas in the case of phosphate addition, as simulated by the comparative coating material ETL3, the comparative coating material ETL1 is substantially less resistant to the MEK solvent.

5.4 Testing for Corrosion Resistance

To test the corrosion resistance, films of the electrocoat materials ETL1 and ETL2 are deposited on cathodically connected, phosphatized test panels within 2 minutes at a deposition voltage of 220-350 V and a coating bath temperature of 28-34° C., and baked. These test panels are subjected to salt spray mist testing in accordance with the method described above, after which the rust coverage (surface rust) of the samples is ascertained. The corresponding results are listed in table 8 below.

TABLE 8

| Inventive/ [comparative example | Undermining as per DIN EN ISO 4628-8 after salt spray mist testing according to DIN EN ISO 9227 NSS [mm] | Surface rust as per DIN EN ISO 4628-3 after salt spray mist testing according to DIN EN ISO 9227 NSS [rating] |
|---|---|---|
| ETL1 | 1 | 1 |
| ETL2 | 1 | 1 |

5.5 Testing of Weather Resistance

For determining the weather resistance, coating films of the electrocoat materials ETL1 and ETL2 are deposited on cathodically connected, phosphatized test panels within 2 minutes at a deposition voltage of 220-350 V and a coating bath temperature of 28-34° C., and are baked at 175° C. The panels are subjected without a topcoat system for 240 h, in accordance with the above-described method, to weathering (WOM) according to DIN EN ISO 16474-1, DIN EN ISO 16474-2, DIN EN ISO 4892-1, and DIN EN ISO 4892-2, and gloss and color value are determined before (unexposed) and after exposure. The results are set out in table 9.

TABLE 9

| Measure before and after 240 h WOM exposure | ETL1 (comparative) | ETL 2 (inventive) |
|---|---|---|
| Gloss 60° unexposed | 79 | 74 |
| Gloss 60° after WOM exposure | <16 | >55 |
| Delta b (before/after WOM exposure) | in each case >7.5 | in each case <2.5 |

The results show clearly that the inventive electrocoat material ETL2 exhibits less chalking (i.e., exhibits better gloss retention) and undergoes less yellowing, it is therefore in total decomposed to a lesser extent by shortwave light, than the comparative coating ETL1. This is important especially for primerless processes where there is a risk of decomposition of the dip coating film by UV rays.

5.6 Further Investigations of the Crosslinking and of the Phosphate Sensitivity

The number of average MEK doublerubs, as a measure of the solvent resistance with respect to the solvent MEK, was determined as described in section 5.2 and section 5.3, for determining the crosslinking status and hence as a measure of crosslinking. In this case, coating films of the phosphate-containing electrocoat materials ETL3, ETL4 and ETL6 to ELT9 are deposited on cathodically connected, phosphatized test panels within 2 minutes with a deposition voltage of 220-350 V and a coating bath temperature of 28-34° C. The metal test panels are subsequently baked for 15 minutes at a substrate temperature of 160° C. To test the crosslinking status of the baked coating films, the solvent resistance was determined according to DIN EN 13523-11 (date September 2011) (MEK test, i.e., solvent resistance with respect to methyl ethyl ketone (MEK)) by the method described above. The results are set out in table 10. The numerical figures represent the number of double rubs (DR) found for a substrate temperature of 160° C.

TABLE 10

| Inventive/comparative example | 160° C. |
|---|---|
| ETL3 (comparative, containing 0 wt % of TACT)* | 20 |
| ETL6 (comparative, containing 20 wt % of TACT)* | 50 |
| ETL7 (inventive, containing 30 wt % of TACT)* | 100 |
| ETL8 (inventive, containing 40 wt % of TACT)* | 100 |
| ETL9 (inventive, containing 50 wt % of TACT)* | 100 |
| ETL4 (inventive, containing 100 wt % of TACT)* | 100 |

The figures in wt % in each case relate to the total weight of cross linking agent(s) in the respective electrocoat material.

From table 10 it can be seen that the inventive electrocoat materials ETL7 to ETL9 and ETL4 exhibit no response to addition of phosphate, whereas in the case of a simulated addition of phosphate, the comparative coating materials ETL3 and ETL6 are substantially less resistant to the MEK solvent than are ETL7 to ETL9 and ETL4.

What is claimed is:

1. A cathodically depositable aqueous electrodeposition coating material comprising
    1 to 40 wt %, based on total weight of the electrodeposition coating material, of (a) at least one epoxide-amine adduct,
    0.2 to 20 wt %, based on total weight of the electrodeposition coating material, of (b) at least one pigment and/or at least one filler, and
    0.5 to 30 wt %, based on total weight of the electrodeposition coating material, of (c) a mixture of at least two crosslinking agents,
    wherein at least one tris(alkoxycarbonylamino)-1,3,5-triazine accounts for at least 25 wt % of component (c) and at least one blocked polyisocyanate or a mixture of at least one blocked polyisocyanate and at least one amino resin accounts for the weight balance of component (c).

2. The electrodeposition coating material as claimed in claim 1, wherein the at least one tris(alkoxycarbonylamino)-1,3,5-triazine accounts for at least 30 wt % of component (c).

3. The electrodeposition coating material as claimed in claim 1, wherein the at least one tris(alkoxycarbonylamino)-1,3,5-triazine accounts for at least 35 wt % of component (c).

4. The electrodeposition coating material as claimed in claim 1, wherein component (c) is present in an amount of 5 to 45 wt %, based on a total solids content of the electrodeposition coating material.

5. The electrodeposition coating material as claimed in claim 1, wherein said tris(alkoxycarbonylamino)-1,3,5-triazine comprises at least one tris(alkoxycarbonylamino)-1,3,5-triazine of the general formula (I)

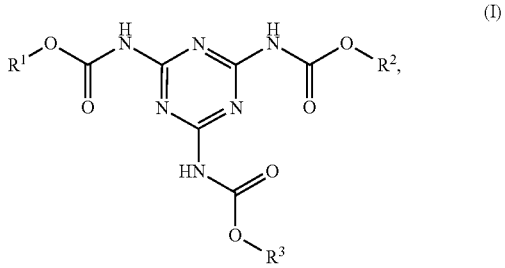

in which the radicals $R^1$, $R^2$, and $R^3$ each independently of one another are $C_1$-$C_8$ alkyl groups.

6. The electrodeposition coating material as claimed in claim 5, wherein the radicals $R^1$, $R^2$, and $R^3$ each independently of one another are $C_1$-$C_4$ alkyl groups.

7. The electrodeposition coating material as claimed in claim 1, wherein component (b) is present in an amount of 0.5 to 17.5 wt %, based on total weight of the electrodeposition coating material.

8. The electrodeposition coating material as claimed in claim 1, wherein a relative weight ratio of components (a) and (c) to one another in the electrodeposition coating material is in a range from 5:1 to 1.1:1.

9. The electrodeposition coating material as claimed in claim 1, wherein the at least one epoxide-amine adduct (a) is a reaction product of at least one epoxy resin based on bisphenol A and at least one primary and/or secondary amine and/or salts thereof and/or at least one salt of a tertiary amine.

10. The electrodeposition coating material as claimed in claim 1, which is capable of:

reducing or eliminating sensitivity to disruption of an electrodeposition coating bath comprising said electrodeposition coating material toward impurities present therein through phosphates and/or through other metal salts which have been carried into the electrodeposition coating bath as a result of pretreatment steps ahead of an electrodeposition coating; and/or lowering a baking temperature of said electrodeposition coating material in a case of at least partial coating of an electrically conductive substrate to a temperature in a range from 125° C. to 165° C.

11. The electrodeposition coating material as claimed in claim 10, wherein said tris(alkoxycarbonylamino)-1,3,5-triazine comprises at least one tris(alkoxycarbonylamino)-1,3,5-triazine of the general formula (I)

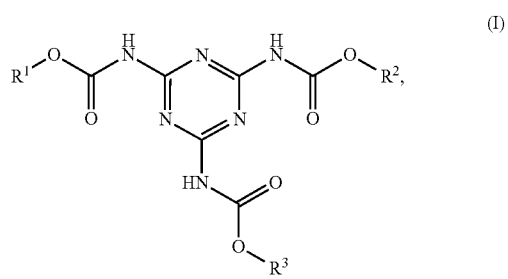

in which the radicals $R^1$, $R^2$ and $R^3$ each independently of one another are $C_1$-$C_8$ alkyl groups.

12. The electrodeposition coating material as claimed in claim 1, wherein at least one tris(alkoxycarbonylamino)-1,3,5-triazine accounts for at least 25 wt % of component (c) and at least one blocked polyisocyanate accounts for the weight balance of component (c).

13. The electrodeposition coating material as claimed in claim 1, wherein component (a) is present in an amount of 35 to 85 wt %, based on a total solids content of the electrodeposition coating material.

14. The electrodeposition coating material as claimed in claim 1, wherein component (a) is present in an amount of 40 to 85 wt %, based on a total solids content of the electrodeposition coating material.

15. The electrodeposition coating material as claimed in claim 1, wherein component (a) is present in an amount of 50 to 70 wt %, based on a total solids content of the electrodeposition coating material, and component (c) is present in an amount of 10 to 35 wt %, based on the total solids content of the electrodeposition coating material.

16. The electrodeposition coating material as claimed in claim 1, wherein the electrodeposition coating material has a pH in a range from 2.5 to 7.5.

17. The electrodeposition coating material as claimed in claim 1, wherein the electrodeposition coating material has a pH in a range from 4.0 to 6.5.

18. A method for at least partially coating an electrically conductive substrate by cathodic electrodeposition coating, in which
(1) the electrically conductive substrate is immersed at least partially into an electrodeposition coating bath which comprises the electrodeposition coating material as claimed in claim 1,
(2) the substrate is connected as cathode,
(3) a coating film is deposited on the substrate using direct current,
(4) the coated substrate is removed from the electrodeposition coating bath, and
(5) the coating film deposited on the substrate is baked.

19. The method as claimed in claim 18, wherein a baking temperature according to step (5) is in a range from 125 to 165° C.

20. The method as claimed in claim 19, wherein the electrically conductive substrate used in step (1) is a substrate pretreated with at least one metal phosphate.

21. A partially coated electrically conductive substrate obtained by the method as claimed in claim 19.

22. The method as claimed in claim 18, wherein the electrically conductive substrate used in step (1) is a substrate pretreated with at least one metal phosphate.

23. A partially coated electrically conductive substrate obtained by the method as claimed in claim 22.

24. An electrically conductive substrate which is at least partially coated with a baked electrodeposition coating material as claimed in claim 1.

\* \* \* \* \*